United States Patent [19]

Lee

[11] Patent Number: 5,995,466
[45] Date of Patent: Nov. 30, 1999

[54] OPTICAL PICKUP LENS CLEANING DEVICE FOR DOUBLE-SIDED DISK PLAYER

[75] Inventor: Young Won Lee, Suwon, Rep. of Korea

[73] Assignee: Samsung Electronics Co., Ltd., Kyungki-do, Rep. of Korea

[21] Appl. No.: 08/036,857

[22] Filed: Mar. 25, 1993

[30] Foreign Application Priority Data

Sep. 29, 1992 [KR] Rep. of Korea ........................ 92-17755

[51] Int. Cl.⁶ ..................................................... G11B 7/12
[52] U.S. Cl. .............................................................. 369/71
[58] Field of Search ..................................... 369/214, 244, 369/71; 360/128, 137

[56] References Cited

U.S. PATENT DOCUMENTS 5,335,128  8/1994  Morinaka ................................. 360/128

FOREIGN PATENT DOCUMENTS 4-82001  3/1992  Japan ...................................... 360/137

Primary Examiner—David D. Davis
Attorney, Agent, or Firm—Sughrue, Mion, Zinn, Macpeak & Seas, PLLC

[57] ABSTRACT

An optical pickup lens cleaning device for a double-sided disk player for recording desired signals on each side of the double-sided disk or reproducing the desired signals therefrom. The cleaning device includes an optical pickup assembly having first and second lateral rack gears, and a semi-circular rack gear connected to the corresponding ends of the first and second rack gears. The first and second rack gears are spaced at a predetermined distance so that the disk can be disposed therebetween and are disposed on a frame together with the semi-circular rack gear in a continuous manner. The optical pickup assembly is movable along the rack gears so as to be moveable from one side of the disk to the opposite side thereof. A lens cleaning mechanism is disposed at a center of an arc of the semi-circular rack for cleaning a lens to be mounted on a base of the optical pickup assembly when the assembly is moved from the one side of the disk to the opposite side. Therefore, the lens in the pickup assembly is automatically cleaned during normal operation without the need for a separate lens cleaning device.

2 Claims, 4 Drawing Sheets

OPTICAL PICKUP LENS CLEANING DEVICE FOR DOUBLE-SIDED DISK PLAYER

BACKGROUND OF THE INVENTION

1. Field of the Invention

The present invention relates to a cleaning device for a double-sided disk player, and more particularly, to an optical pickup lens cleaning device for a double-sided disk player, which can automatically clean a lens mounted on an optical pickup assembly for recording signals or reproducing signals from opposite sides of a disk.

2. Background

Conventional double-sided disk players include an optical pickup assembly which is moveable along the radial direction of the disk and in a vertical to access the upper and lower sides of the disk. In this manner the optical pickup assembly can record signals on or reproduce signals from opposite sides of the disk.

Such a disk player is disclosed in, for example, Japanese utility model laid-open publication No. 63-49667. More specifically, this disk player includes a guide member having first and second linear guide rail portions and a U-shaped guide rail portion interconnected with the first and second guide rail portions, a rack gear continuously formed on an internal surface of the guide member, and a connecting gear engaged with the rack gear and driven by a motor mounted on the optical pickup assembly. Thus, the optical pickup assembly is movable from an upper side of the disk to the lower side of the disk along the guide member to record signals on or reproduce signals from the upper and lower sides of the disk.

In such a conventional double-sided disk player, an important concern is that foreign substances such as dust particles are likely to be disposed on the lens of the pickup assembly, thereby adversely effecting the efficiency of the lens undesirably.

For this reason, the conventional pickup assembly requires a device for cleaning the lens of the pickup assembly periodically to remove the foreign substances. Alternatively, it is necessary to employ a disk having a lens cleaner separately designed from the pickup assembly for cleaning the lens. Accordingly, with the conventional disk player, lens cleaning is a very complicated matter and elaborate components are likely to be damaged when cleaning the lens.

SUMMARY OF THE INVENTION

An object of this invention is to provide an optical pickup lens cleaning device for a double-sided disk player in which an optical lens can be automatically cleaned while moving it from one side of the disk to the opposite side, without a separate lens cleaning process.

To achieve the above object, according to an aspect of the invention, there is provided an optical pickup lens cleaning device for a double-sided disk player for recording desired signals on opposite sides of a disk or for reproducing desired signal from the opposite sides of the disk. The disk is stably placed on a turntable rotated by a spindle motor and comprises an optical pickup assembly having first and second linear rack gears for interposing the disk therebetween and a semi-circular rack gear interconnected with corresponding ends of the first and second rack gears, the first and second rack gears being spaced at a predetermined distance and the semi-circular rack gear being continuously patterned on a frame, the optical pickup assembly being moveable along the rack gears so as to access the upper and lower sides of the disk; and means disposed at a center of the arc of the semi-circular rack gear for cleaning a lens to be mounted on a base of the optical pickup assembly during the up and down movement of the assembly.

With the optical lens cleaning device thus constructed, the lens can be automatically cleaned by the lens cleaning means disposed at the center of the semi-circular rack gear.

BRIEF DESCRIPTION OF THE DRAWINGS

The above and other objects, features and advantages of the invention will be apparent from the following description taken in conjunction with the accompanying drawings, in which.

DETAILED DESCRIPTION OF THE PREFERRED EMBODIMENT

Hereinafter, a preferred embodiment of the invention will be described in more detail.

Figure 1:
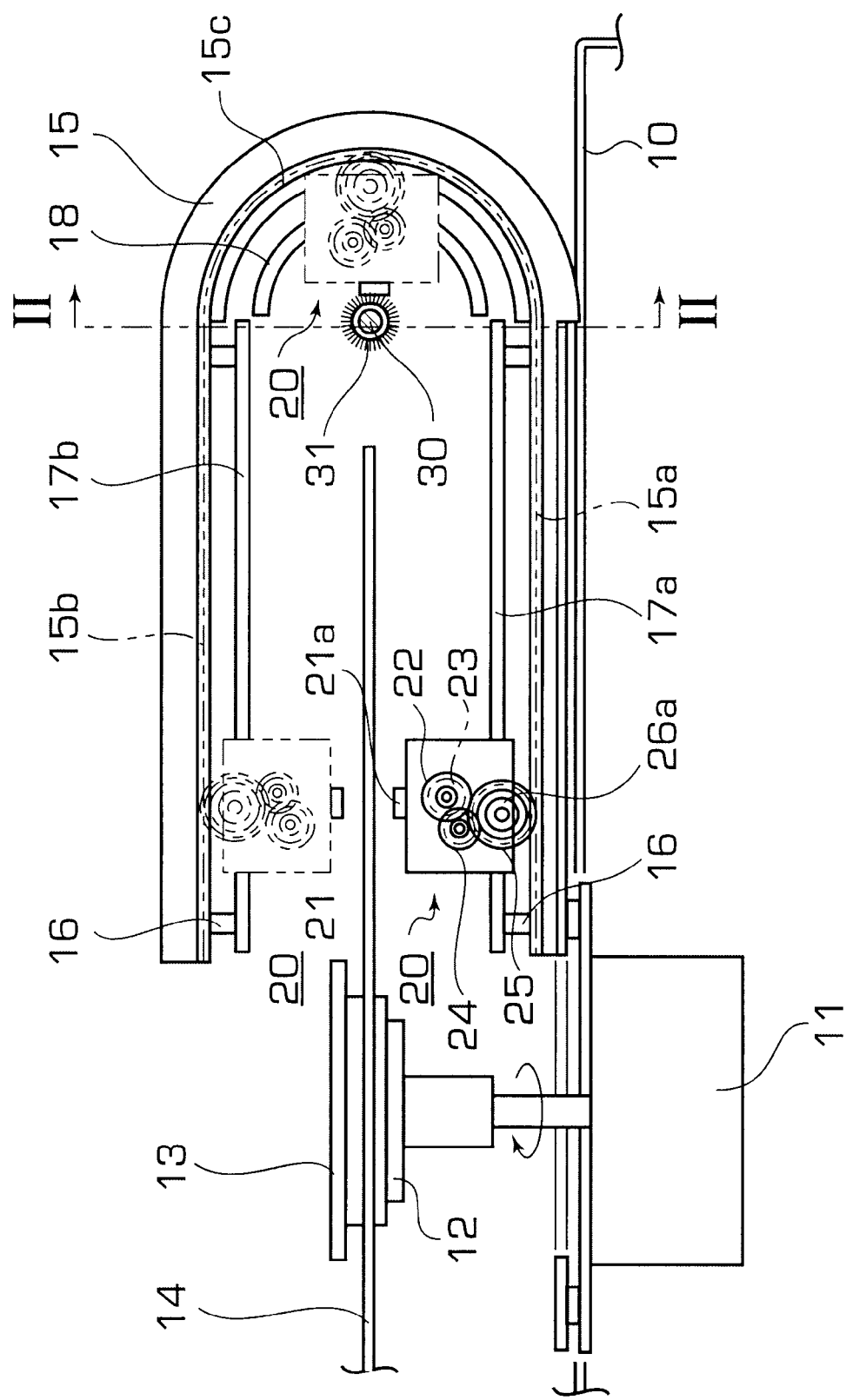
FIG. 1 is a schematic front view showing an embodiment of an optical pickup lens cleaning device for a double-sided disk player according to the present invention.

FIG. 1 is a schematic front view showing important parts of a double-sided disk player having an optical pickup lens cleaning device according to this invention. Referring to FIG. 1, a turntable 12 is disposed at a top end of a shaft of a spindle motor 11 which is connected with a chassis 10 at one side thereof. A disk 14 is stably placed on the turntable 12 and retained thereon by a clamper 13 such that the disk 14 is rotated together with the turntable 12 in response to rotation of the motor 11. First and second parallel rack gears 15a and 15b are provided on the chassis and spaced from each other by a predetermined distance for interposing the disk therebetween, and a semi-circular rack gear 15c interconnects the first and second linear rack gears 15a and 15b. The parallel rack gears 15a and 15b and the semi-circular rack gear 15c are arranged on a single frame 15.

First and second feed shafts 17a and 17b are inwardly disposed by way of fixing rods 16 on the first and second rack gears 15a and 15b, respectively. Also, a guide piece 18 is inwardly provided in front of the semi-circular rack gear 15c.

Figure 2:
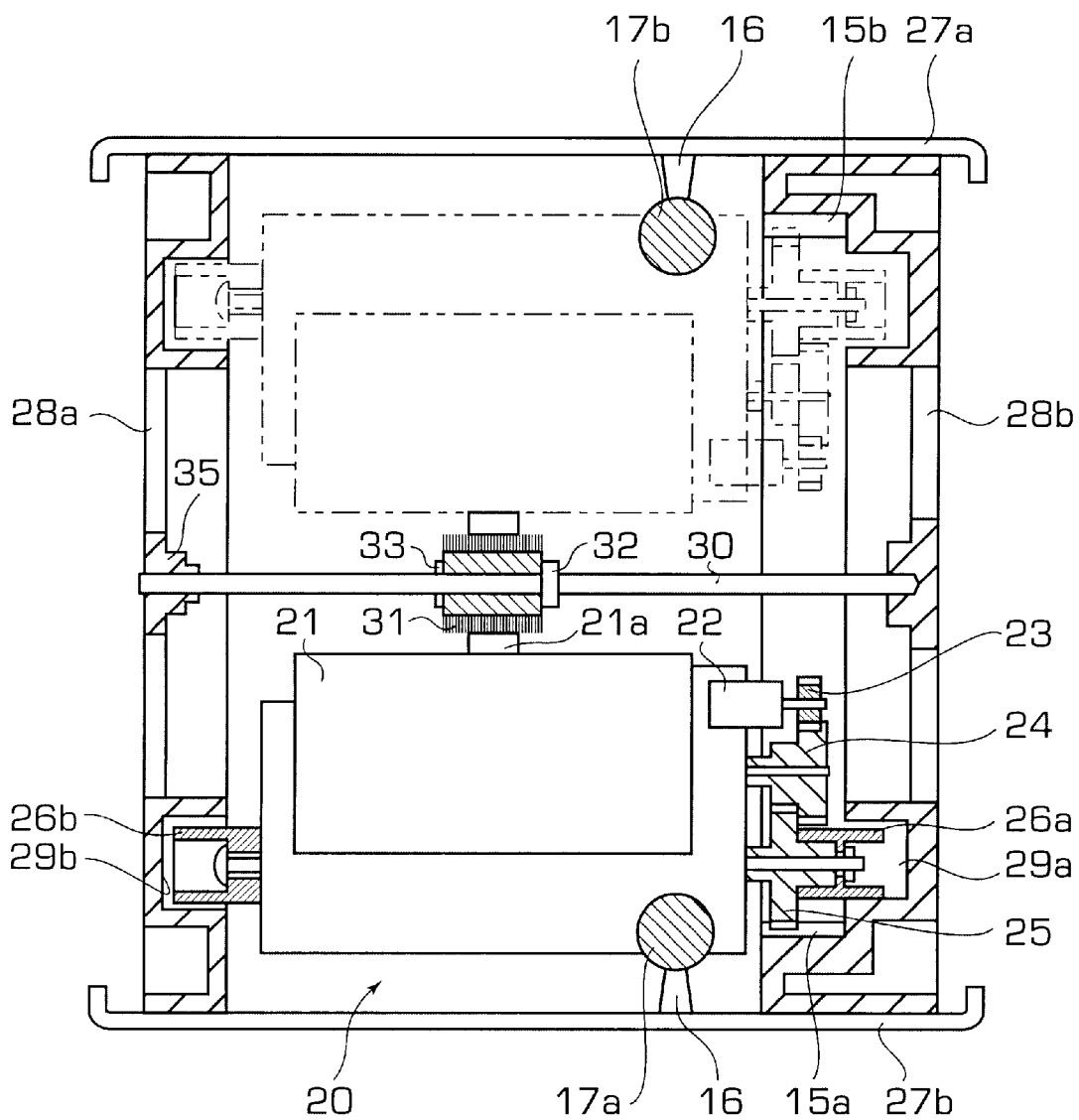
FIG. 2 is a cross-sectional view taken away along a line A—A in FIG. 1.

In accordance with the optical pickup assembly for recording a desired signal on or reproducing a desired signal from the disk 14 as shown in FIG. 2, a lens 21a is mounted on a base 21 of an assembly 20, and a driving gear 23, rotatable by way of a motor 22, is engaged with first connecting gears 24 which in turn is engaged with second connecting gear 25. A first roller 26a is provided at an external periphery of the second connecting gear 25 and a second roller 26b is disposed on the opposite side of the base 21 with respect to the first roller 26a. These rollers 26a and 26b are disposed in guiding grooves 29a and 29b formed in frames 28a and 28b, respectively. The frames 28a and 28b are coupled to each other by upper and lower plates 27a and 27b.

Figure 3:
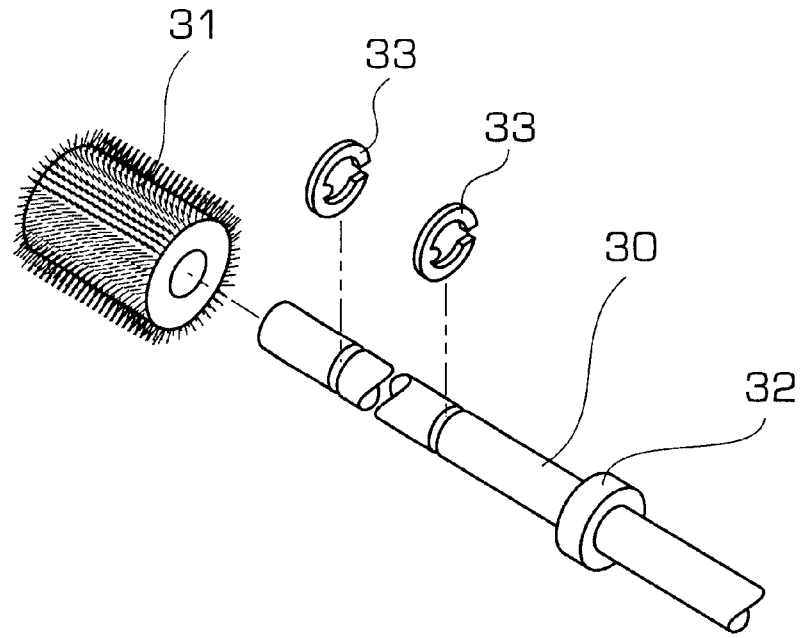
FIG. 3 is a disassembled perspective view of the optical pickup lens cleaning device according to this invention.

In FIG. 1, the base 21 is mounted at the bottom portion of the pickup assembly on the first feed shaft 17a. The second connecting gear 25 of the optical pickup assembly 20 is engaged with the first parallel rack gear 15a. Referring to FIGS. 2 and 3, at a center of the circular arc of the semi-circular rack gear 15c is disposed a brush 31. The brush is arranged at a center of a fixed shaft 30 which is fixed to the frames 28a and 28b. The bush is positioned by a fixing ring 32 and an E-shaped ring 33. Accordingly, when the optical pickup assembly 20 accesses the upper or lower side of the disk 14, the lens 21a mounted on the base is automatically cleaned by the brush 31, during the vertical movement of the assembly 20, as illustrated in FIG. 1.

Figure 5:
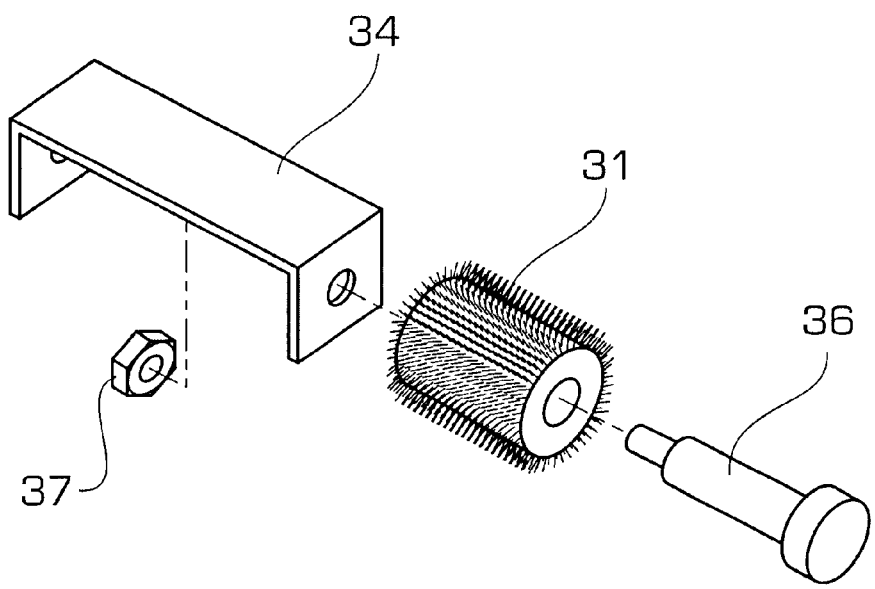
FIG. 5 is a disassembled perspective view of the pickup lens cleaning device in FIG. 4.
Figure 4:
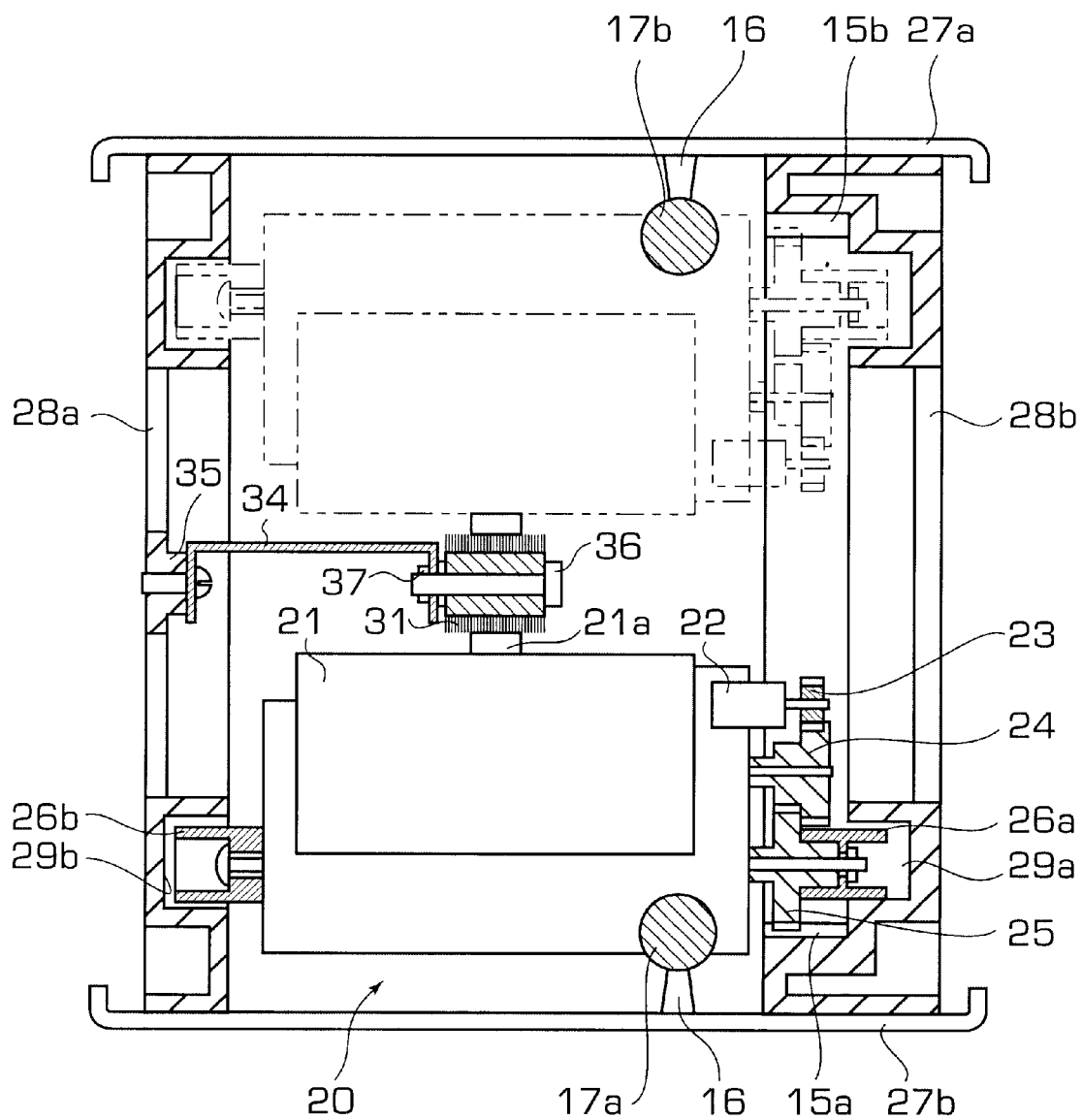
FIG. 4 is a cross-sectional view showing another example of the optical pickup lens cleaning device of this invention.

Referring to FIGS. 4 and 5, an optical pickup lens cleaning device according to another embodiment of the invention is illustrated. The optical pickup assembly 20 in FIGS. 4 and 5 has the same construction as that of the first embodiment and the lens cleaning device is also arranged at the center of the semi-circular rack gear 15c, as previously described with reference to FIG. 1.

According to this embodiment, an L-shaped bracket 34 is fastened on the side frame 28a with a screw 35 and the brush 31 is attached to the opposite side of the bracket 34 by way of a screw 36 and a nut 37, as best illustrated in FIG. 4.

In accordance with the optical lens cleaning device thus constructed, the disk 14 is stably placed on the turntable 12 and rotated in response to the rotation of the motor 11. In this state, the optical pickup assembly 20 positioned on the lower side of the disk 14 is moved along the first feed shaft 17a (in the radial direction of the disk) in response to rotation of the driving gear 23 and the connecting gears 24 and 25 so as to record signals on or reproduce signals from the lower side of the disk 14.

After the pickup assembly 20 accesses the lower side of the disk 14, the optical pickup assembly 20 is further moved to the upper side of the disk 14 to record signals on or reproduce signals from the upper side of the disk 14. More specifically, to access the upper side of the disk 14, the optical pickup assembly 20 is first moved along the first parallel rack gear 15a and the semi-circular rack gear 15c in response to rotation of the motor 22 and is then moved along the second feed shaft 17b in the radial direction of the disk.

Thus, the optical pickup assembly 20 can record or reproduce the desired signals on or from the upper surface of the disk 14.

According to the invention, when the pickup assembly 20 is positioned at the center of the semi-circular gear 15c, the brush 31 contacts the lens 21a mounted on the base 21 of the optical pickup assembly 20. Accordingly, the lens 21a is cleaned by the brush 31 as the optical pickup assembly 20 rotates 180 degrees when being conveyed from the lower side of the disk to the upper side of the disk 14. Similarly, when the optical pickup assembly is moved from the upper side of the disk to the lower side of the disk 14, the cleaning operation is executed in the same way as above.

The brush 31 attached to the bracket 34 coupled to the side frame 28a, as shown in FIGS. 4 and 5, is similarly operated to clean the optical lens 21a.

As described above, according to the present invention, since the lens in the pickup assembly is automatically cleaned during the up and down movement of the pickup assembly to access the opposite sides of the disk, the foreign substances, such as dust, are removed without any separate lens cleaning.

Although this invention has been described with reference to the specified examples, it will be understood that many changes and modifications can be made therein without departing from the true scope and spirit of the invention.

What is claimed is:

1. An optical pickup lens cleaning device f or a double-sided disk player for recording desired signals on each of the double-sided disk or reproducing desired signals from each side of the double-sided disk, the disk player including first and second, parallel rack gears respectively disposed on opposite sides of said disk, a semi-circular rack gear interconnecting corresponding ends of said first and second rack gear, said first and second rack gear and said semi-circular rack gear constituting a continuous U-shaped gear path, an optical pickup assembly disposed on said gear path and being movable from one side of said disk to opposite side thereof, side pickup assembly including an optical lens and drive means for driving said pickup assembly along said gear path, the optical pickup lens cleaning device comprising:

means, disposed proximate a center of an arc of the semi-circular rack, for cleaning the lens of said optical pickup assembly during its movement from said one side to said opposite side, wherein said lens cleaning means includes a fixed shaft connected at opposite sides thereof to a fixed frame and a brush rotatably disposed on said shaft.

2. The optical pickup lens cleaning device according to claim 1, wherein said lens cleaning means includes a bracket fixed at one end thereof to said frame and a brush disposed at an opposite end of said bracket.

* * * * *